United States Patent [19]
Kinoshita et al.

[11] Patent Number: 6,031,308
[45] Date of Patent: *Feb. 29, 2000

[54] GEARED MOTOR

[75] Inventors: Satoshi Kinoshita; Keisuke Sakagami, both of Suwa, Japan

[73] Assignee: Seiko Epson Corporation, Suwa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/981,788

[22] PCT Filed: Jun. 25, 1997

[86] PCT No.: PCT/JP97/02202

§ 371 Date: Dec. 30, 1997

§ 102(e) Date: Dec. 30, 1997

[87] PCT Pub. No.: WO98/00901

PCT Pub. Date: Jan. 8, 1998

[30] Foreign Application Priority Data

Jul. 1, 1996 [JP] Japan .................................. 8-190103

[51] Int. Cl.⁷ .............................. H02K 7/06; F16H 1/12; F16H 57/08
[52] U.S. Cl. .................. 310/83; 310/40 MM; 74/421 A; 475/331
[58] Field of Search ................................... 310/83, 99, 80, 310/40 MM, 89; 318/12, 15; 396/477, 798; 74/640, 421 A, 424.8 C, 431, 435, 421 R; 475/5–7, 10–11, 174, 176, 220, 225, 329–343

[56] References Cited

U.S. PATENT DOCUMENTS

| | | | |
|---|---|---|---|
| 3,707,037 | 12/1972 | Gutris | 29/596 |
| 3,774,477 | 11/1973 | Murphy | 74/801 |
| 4,680,979 | 7/1987 | Morishita et al. | 74/7 E |
| 5,452,622 | 9/1995 | Fenelon | 74/411 |
| 5,593,360 | 1/1997 | Ishida et al. | 475/331 |

FOREIGN PATENT DOCUMENTS 05321987 12/1993 Japan .

*Primary Examiner*—Nestor Ramirez
*Assistant Examiner*—Dang Dinh Le
*Attorney, Agent, or Firm*—Pollocki, Vande Sande & Amernick

[57] ABSTRACT

A geared motor is provided. A through hole formed in a base passes a rotor shaft. An annular guide rim to guide a carrier and a cylindrical stationary gear are integrally and concentrically formed on the base which seals an open end of a small motor. A guide to guide the rotation of a movable gear is provided at the top end of the stationary gear. The gears making up the geared motor are disposed in a compact arrangement with high accuracy.

8 Claims, 3 Drawing Sheets

GEARED MOTOR

FIELD OF THE INVENTION

This invention relates to motors used in geared small machines and equipment such as cameras and printers.

DESCRIPTION OF THE PRIOR ART

A conventional geared motor used in small machines such as cameras forms a small drive mechanism providing a high reduction ratio that comprises a sun gear attached to the free end of the motor shaft and a combination of a stationary and a movable internally-toothed gears, whose numbers of teeth are somewhat different from each other, that are meshed together via a common planetary gear that is in mesh with the sun gear, as disclosed in Japanese Provisional Patent Publication No. 321987 of 1993. Designed to be attached to the free end of the motor, however, this type of drive mechanisms involves a need to further reduce the size of the motor itself to permit use in, for example, cameras of the latest design that employ smaller film cartridges than before.

A drive mechanism disclosed in Japanese Provisional Patent Publication No. 71452 of 1993 offers a solution to the above problem by fastening a stationary internally-toothed gear directly to one end of the casing of a small motor. While possessing an advantage to permit a further reduction in the axial dimension of the motor, this drive mechanism has a problem in that the internally-toothed gear, carrier and other members must be positioned with respect to each other with great accuracy.

Another drive mechanism disclosed in Japanese Provisional Patent Publication No. 88746 of 1988 permits a further reduction in the axial dimension of a geared motor by eliminating a carrier to support a planetary gear and guiding the shaft of a planetary gear by the base of the mechanism and the peripheral wall of a disk provided to a movable internally-toothed gear. However, this drive mechanism cannot give adequate support to the planetary gear. When transmitting a driving force from the stationary internally-toothed gear to the movable internally-toothed gear, as such, the planetary gear tilts to impede the transmission of rotary motion.

An object of this invention that offers a solution to the above problem is to provide a new type of geared motor that permits exact positioning of individual members with respect to each other and a substantial reduction in the axial dimension.

Another object of this invention is to provide a new type of geared motor that permits highly reliable transmission of driving force by supporting the planetary gear in a stable position.

SUMMARY OF THE INVENTION

A geared motor according to this invention comprises a base covering the free end of the shaft of a small motor that has a guide for a rotating carrier supporting a planetary gear and a stationary gear having a guide for a movable gear that are integrally and concentrically formed around a through hole to pass the rotor shaft of the small motor. The geared motor thus designed reduces the axial dimension of the motor itself and accurately positions the individual members thereof.

A geared motor according to this invention also comprises a base covering the free end of the shaft of a small motor and a movable gear that rotates along a guide provided on a stationary gear, each of which having an annular guide that guides a planetary gear to permit the planetary gear to rotate on its own axis and along the guide. The annular guide is formed concentrically around a through hole at the center to pass the rotor shaft of the small motor. At the same time, both sides of the rim of the planetary gear are disposed very close to the facing surfaces of the base and movable gear. This design eliminates the tilting of the planetary gear that otherwise might occur during the transmission of driving force.

PREFERRED EMBODIMENTS OF THE INVENTION

Now preferred embodiments of this invention are described.

Figure 1:
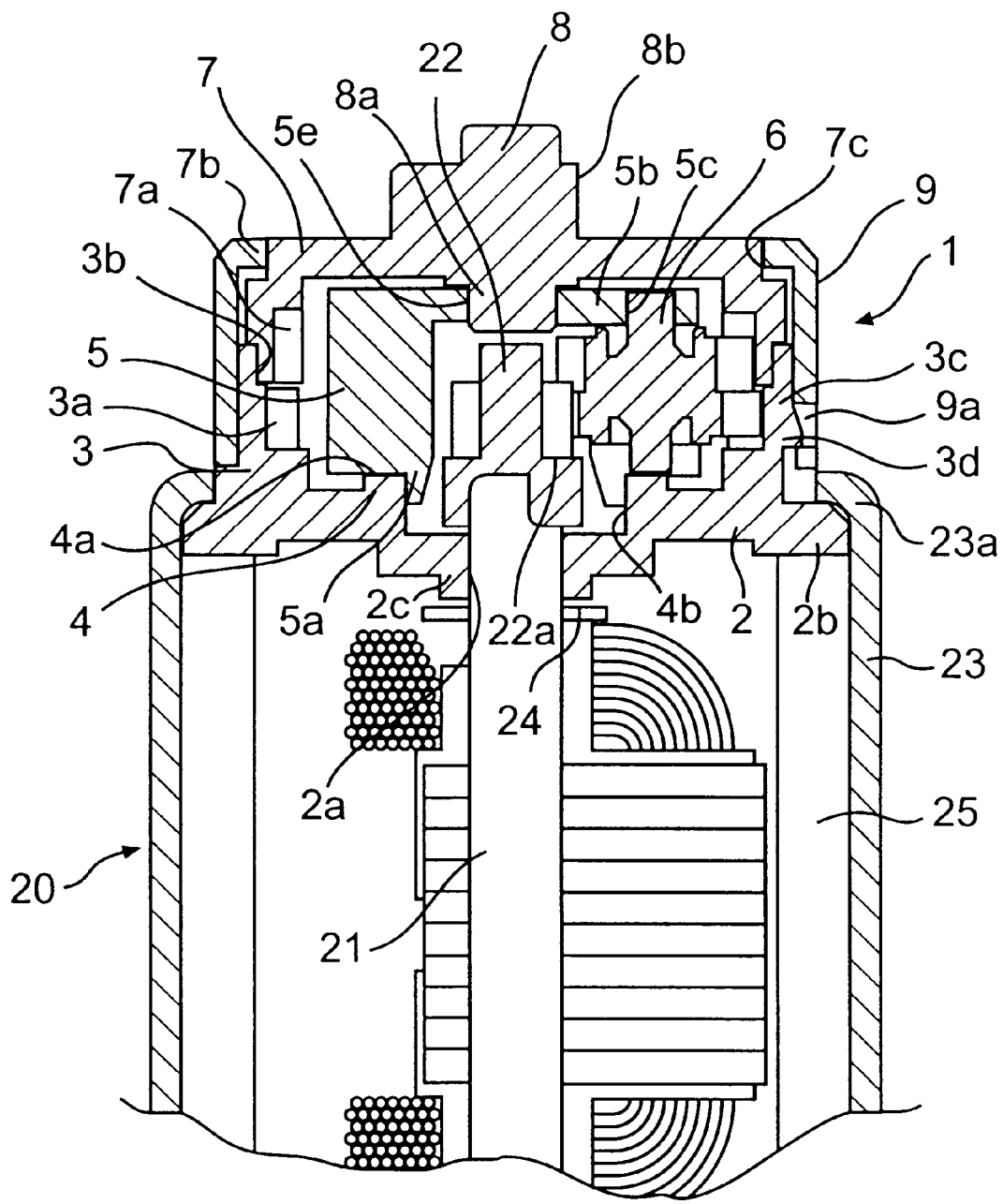
FIG. 1 is a cross-sectional view showing a geared motor according to the invention.
Figure 2:
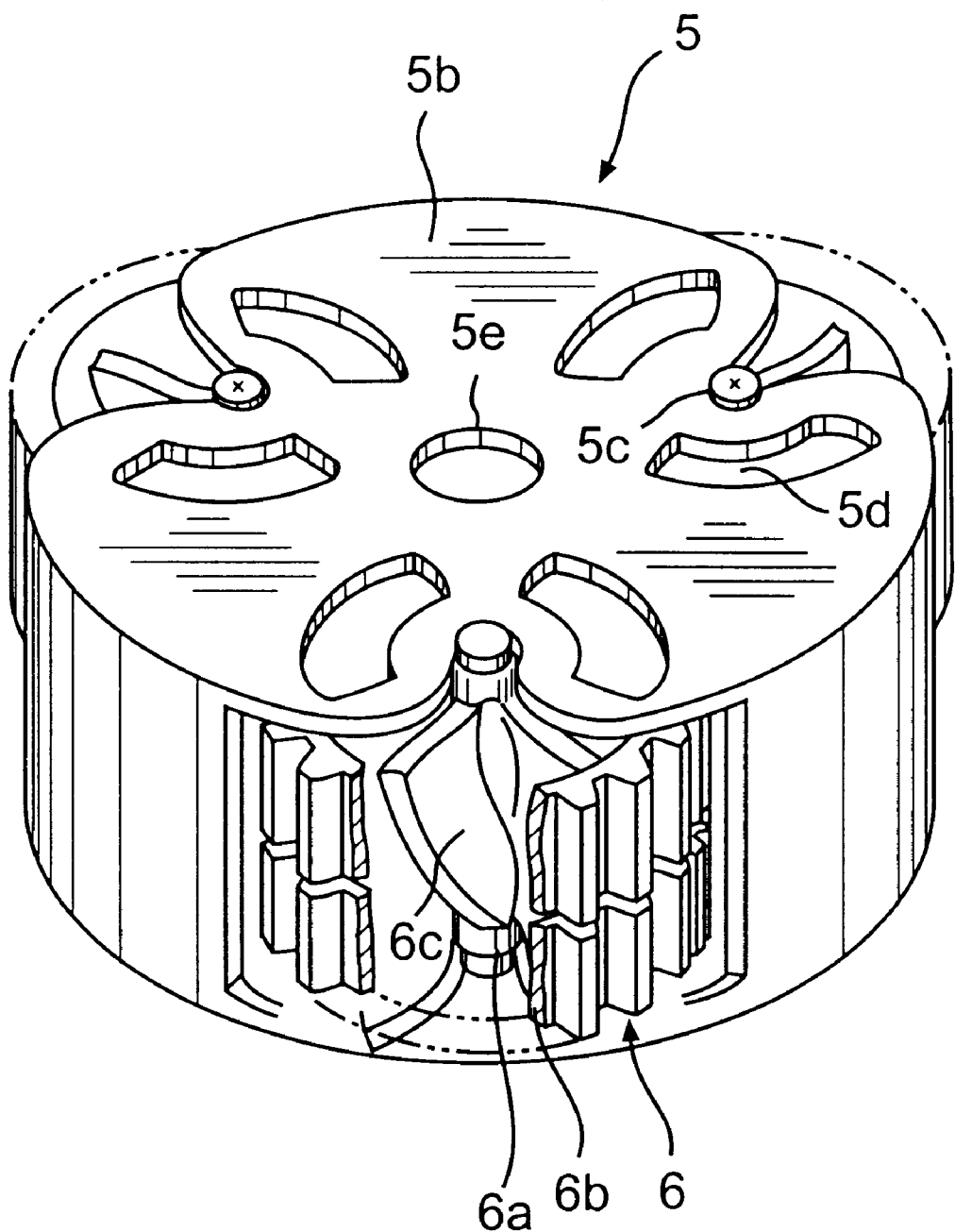
FIG. 2 is a perspective view showing the mechanism of a planetary gear used in the same embodiment.

FIGS. 1 and 2 show a first embodiment of this invention.

In the drawings, reference numeral 1 denotes a reduction unit fitted to the free end of a small motor 20. A base 2 that positions and supports the component members of the reduction unit 1 also serves as a casing to cover the free end of the small motor 20.

The base 2 is made of resin such as noncrystalline polyamide that permits precision forming with stationary and movable molds. On the outer side of the base 2 are formed a stationary cylindrical gear 3 having internal teeth 3a and an annular rim 4 to guide a carrier 5 that are disposed concentrically around a through hole 2a at the center to pass the rotor shaft 21.

A stepped engaging rim 2b is provided along the periphery of the base 2. The engaging rim 2b is fastened to the free end of the shaft of the small motor 20 by crimping an edge 23a of a casing 23. Or, otherwise, the engaging rim 2b is held between the edge 23a and an end of a magnet 25. Thus, the small motor 20 and reduction unit 1 are joined together to construct a geared motor.

At the center of the other side of the base 2 that looks toward the inside of the small motor 20 is formed a boss-like projection 2c. Axial motion of the rotor shaft 21 can be inhibited by bringing a rotor stopping ring 24 or other similar member on the rotor shaft 21 into contact with the projection 2c.

A crown-like stationary gear 3 projecting from the outer periphery of the base 2 forms the main part of a train of reduction rings together with a movable gear 7 that is meshed therewith via a planetary gear 6 discussed later. A stepped guide surface 3b to allow the movable gear 7 to rotate around the axis of the rotor shaft is cut on the inner surface at the top of the stationary gear 3. The outer periphery of the stationary gear 3 provides a surface 3c to which a unit casing 9 is fitted. Connection is achieved by meshing engaging claws 3d projecting therefrom at regular intervals with corresponding engaging holes 9a provided on the casing 9.

A projecting annular guide rim 4 is provided on the inside of the stationary gear 3, with the drum-shaped carrier 5 rotating in contact with the top surface 4a and inner surface 4b of the guide rim 4 mounted thereon.

The carrier 5 has an annular projection 5a that slides in contact with the inner surface 4b of the guide rim 4. In this embodiment, shaft holes 5c are provided on the same circumference on the upper drum-end surface 5b, each of which pivotally supporting a planetary gear 6. Driving force is transmitted by the meshing of the planetary gears 6 with the teeth 22a, 3a and 7a of a sun gear 22 on the rotor shaft 21 and the stationary and movable gears 3 and 7.

The planetary gears 6 may also be rotatably fitted to multiple shafts erected on the inner surface of the drum-end surface 5b. Seizure and fusion due to high-speed rotation can be avoided by making the planetary gear 6 or all of the planetary, stationary and movable gears 6, 3 and 7 from a noncrystalline polyamide having a good formability prepared by adding a reinforcing agent or an olefin-based slide modifier. Thermal conductivity is increased by adding at least 5 percent, or preferably 5 to 20 percent, of a powder of inorganic substance.

The planetary gears 6 have a hob 6a and a rim 6b that are integrally joined together by axially twisted helical spokes 6c whose axial length is somewhat shorter than the length of the hob and rim. The helical spokes 6c preclude the formation of shrinkage cavities in the forming process. When the motor rotates at a high speed, in addition, the helical spokes 6c produces a stream of air that draws the heat generated inside to the outside through through holes 5d near the shaft holes 5c in the drum-end surface 5b of the carrier 5.

The planetary gears 6 are fitted in such a manner as to leave some space between themselves and the flange surface 22a of the sun gear 22, the carrier 5 and the movable gear 7. The total of the spaces thus left is controlled to exceed the amount of the axial motion of the rotor shaft 21. Even when the axial motion of the rotor shaft 21 brings the flange surface 22a of the sun gear 22 into collision with the end surface of the teeth of any planetary gear 6, as such, damages can be avoided by allowing the planetary 6 to escape in the axial direction.

The movable gear 7 the number of whose internal teeth 7a is somewhat different from that of the stationary gear 3 is rotatably fitted to the guide surface 3b on the inner periphery at the top end of the stationary gear 3.

The movable gear 7 is shaped like a disk covering the open end of the reduction unit 1. An integral output shaft 8 protrudes at the center of both surfaces of the top plate 7b of the movable gear 7. The shaft 8a projecting inward is fitted in a shaft hole 5c provided at the center thereof. The shaft 8b projecting outward can be fitted, for example, to the film winder of a camera. One end of the casing 9 mounted on the outer periphery of the stationary gear 3 covers a step 7c provided on the outer periphery at the top end of the movable gear 7 to prevent the movable gear 7 from slipping upward.

The reduction unit 1 described above is positioned and fastened to one end of the small motor 20 by crimping the base 2 to the edge of the casing 23 of the small motor 20 and passing the rotor shaft 21 through the through hole 2a at the center thereof. This reduces the axial dimension to a minimum.

The stationary gear 3 and the guide surface 3b and rim 4 are formed on one side of the base 2 by means of the cavities provided on one of the molds. The movable gear 7 and carrier 5 are correctly positioned with respect to the axis when they are mounted on the guide surface 3b and rim 4 on the stationary gear 3.

The component parts of the reduction unit are formed of resins. Vibrations and noises can be reduced to a minimum by forming at least either of the stationary gear 3 that is integral with the base 2 and the movable gear 7 and carrier 5 that rotate with respect to the stationary gear 3 of a resin whose vibration damping capacity is increased by adding a powder of inorganic substance. A resin mixed with an olefin-based slidability enhancer imparts a good lubricity, whereas a resin having a good thermal conductivity prevents the fusion and seizure that might be caused by the heat generated when the motor rotates at high speeds.

Particularly, noncrystalline polyamides increase strength at high humidities and temperatures, reduce shrinkage anisotropy, and provide high dimensional accuracy. To the polyamide used in the embodiment being described were made additions, all by weight, of 20 to 40 percent of potassium titanate whiskers as a reinforcing agent, 0.1 to 1.0 percent of modified polyethylene as a slide enhancer, 5 to 20 percent of aluminum fibers as a heat conductivity enhancer, and 0.5 to 2.0 percent of ethylene bis stearamide as an release accelerating agent.

Figure 3:
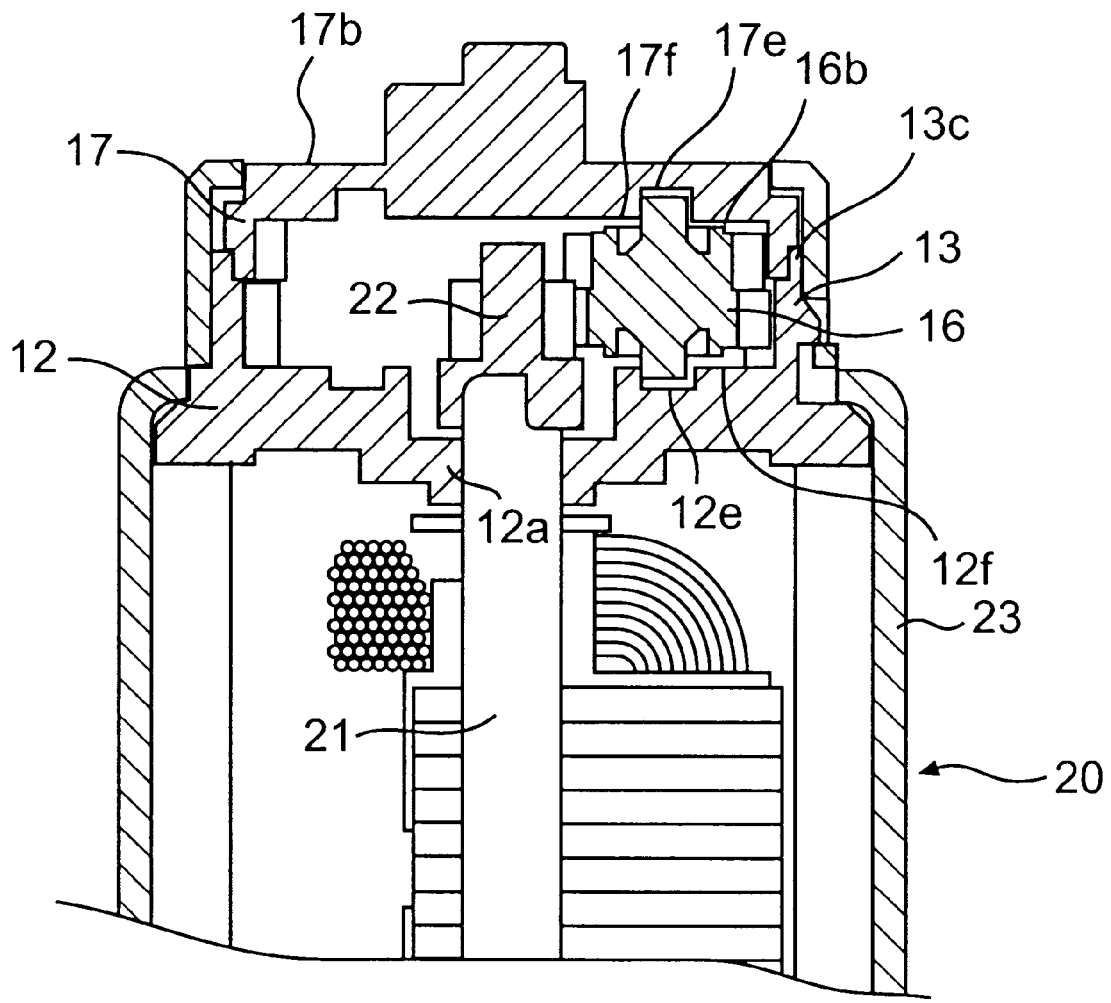
FIG. 3 is a cross-sectional view of another geared motor according to this invention.

FIG. 3 shows a simpler reduction mechanism having no carrier. A base 12 sealing one open end of a small motor 20 has a cylindrical stationary gear 13 on one side thereof. An annular groove 12e guiding the shafts on one side of planetary gears as to permit them to rotate on their own axis and along the groove is formed on the inside around a through hole 12a. A movable gear 17 fitted to a guide surface 13c on the inner periphery at the top end of the stationary gear 13 has an annular groove 17e guiding the shafts on the other side of the planetary gears in such a manner as to permit them to rotate on their own axis and along the groove formed on the inside of the top plate 17b thereof.

In this embodiment, the side surface of each rim 16b of the planetary gears 16 is disposed very close to the facing surface 12f of the base 12 and the facing surface 17f of the movable gear. Therefore, the facing surface 12f of the base 12 and the facing surface 17f of the movable gear 17 support the planetary gears 16 that tilt in a direction opposite to the rotating direction of the movable gear 17 when the rotation of a sun gear 22 is decreased and transmitted from the stationary gear 13 to the movable gear 17.

In this embodiment, the grooves 12e and 17e on the stationary gear 13 and the top plate 17b of the movable gear 17 restrict the motion of the planetary gears 16, thereby dispensing with the carrier and allowing a further simplification of the reduction mechanism. Additionally, the facing surfaces 12f and 17f of the base 12 and movable gear 17 arresting the tilting of the planetary gears 16 in the rotation transmission process assure a stable transmission of driving force.

Geared motors according to this invention may find uses, for example, in film winders, lens adjusting and other motor-driven mechanisms of cameras, paper feeding and discharging roller driving mechanisms of printers, scanners, facsimiles and other electronic apparatus, and disk loading and pickup drive drive mechanisms of optical recording disk drivers and other electronic apparatus.

The through hole to pass the rotor shaft, the guide for the carrier to hold the planetary gears and the cylindrical stationary gear integrally formed on the base covering an open end of a small motor as described earlier permit positioning the sun gear, stationary gear, carrier, planetary gears and movable gear that make up a geared motor with high accuracy, assuring smooth rotation, and reducing noises and vibrations to a minimum. Furthermore, firming the base as a part of the casing of a small motor permits a further size reduction of the geared motor.

In addition, provision of annular guide grooves, which support the shafts of the planetary gears to allow them to rotate on their own axis and along the grooves, on the base and movable gear permits eliminating the carrier and thereby allowing a further simplification of the geared motor. Bringing the rim of the planetary gears close to the facing surfaces of the base and movable gear arrests the tilting of the planetary gears that occurs when driving force is transmitted.

What is claimed is:

1. A geared motor comprising:

a rotating carrier holding planetary gears;

a moveable gear having a disk-like shape and covering an open end of a reduction unit and an integral output shaft protruding at a center of both surfaces of the moveable gear;

a base including an annular guide and a stationary gear with a guide surface both integrally formed as constitute with said base around a through hole, said annular guide guiding said rotating carrier and said guide surface guiding said moveable gear, wherein said stationary gear and said moveable gear have different numbers of teeth meshed with each other via said planetary gears, said base covering an open end of a small motor and connecting to a casing of said small motor; and a sun gear at an end of a rotor shaft, said rotor shaft passing through said through hole in said base and said sun gear meshing with said planetary gears.

2. The motor according to claim 1, in which an engaging member is connected to an edge of the casing of the small motor by crimping and is integrally formed on the periphery of said base.

3. The motor according to claim 1, in which a cylindrical projection to restrict axial motion of said rotor shaft comes into contact with a rotor stopping ring on the rotor shaft.

4. The motor according to claim 1, in which at least one gear selected from a group of said planetary, stationary and movable gears is formed of a noncrystalline polyamide mixed with a powder of a substance having a high thermal conductivity.

5. The motor according to claim 1, wherein a total of spaces between each flange surface of said sun gear and facing surfaces of said rotating carrier and said movable gear and said planetary gears is greater than an axial motion of said rotor shaft.

6. The motor according to claim 1, wherein a hob and rim of said planetary gears are integrally connected by axially twisted helical spokes.

7. A geared motor comprising:

planetary gears;

a moveable gear having a first annular groove at its center guiding shafts on one side of said planetary gears;

a base including a second annular groove and a stationary gear having a guide surface both integrally formed as constitute whole with said base concentrically around a through hole in said base, said guide surface guiding said moveable gear and said second annular groove supporting shafts on another side of said planetary gears, wherein said stationary gear and said moveable gear have different numbers of teeth meshed with each other via said planetary gears, said base covering an open end of a small motor and connecting to a casing of said small motor; and a sun gear at an end of a rotor shaft, said rotor shaft passing through said through hole and said sun gear meshing with said planetary gears, said planetary gears rotating on their own axis along the rotor shaft.

8. The motor according to claim 7, wherein both sides of a rim of said planetary gears are disposed close to facing surfaces of both of said base and said movable gear to arrest a tilting of said planetary gears.

* * * * *